(12) United States Patent
Boegelund

(10) Patent No.: US 8,805,095 B2
(45) Date of Patent: Aug. 12, 2014

(54) ANALYSING CHARACTER STRINGS

(75) Inventor: Flemming Boegelund, Frederikssund (DK)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 13/246,095

(22) Filed: Sep. 27, 2011

(65) Prior Publication Data
US 2012/0141031 A1 Jun. 7, 2012

(30) Foreign Application Priority Data

Dec. 3, 2010 (EP) .................................... 10193605

(51) Int. Cl.
*G06K 9/34* (2006.01)
*G06K 9/46* (2006.01)

(52) U.S. Cl.
USPC ..... 382/229; 382/173; 382/195; 707/E17.039

(58) Field of Classification Search
CPC ..... G06K 9/18; G06K 9/186; G06K 2209/01; G06K 9/6878; G06K 9/72
USPC ......... 382/181, 229, 173, 177, 174, 187, 309, 382/310, 190, 195, 203, 289, 286, 178, 179, 382/189, 186, 224, 228, 185; 708/100, 200, 708/203; 704/1, 9; 715/200, 234, 236, 243, 715/249, 256, 259; 707/E17.039, 999.001, 707/999.003, 999.005
See application file for complete search history.

(56) References Cited

U.S. PATENT DOCUMENTS

| | | | |
|---|---|---|---|
| 6,005,973 A * | 12/1999 | Seybold et al. ............... | 382/187 |
| 6,298,247 B1 | 10/2001 | Alperovich et al. | |
| 7,469,051 B2 | 12/2008 | Sapashe et al. | |
| 7,587,308 B2 * | 9/2009 | Kasravi et al. .................... | 704/9 |
| 8,219,550 B2 * | 7/2012 | Merz et al. ...................... | 707/727 |
| 8,244,046 B2 * | 8/2012 | Takahashi et al. ............ | 382/229 |
| 2002/0116420 A1 | 8/2002 | Allam et al. | |
| 2002/0156799 A1 | 10/2002 | Markel et al. | |
| 2002/0188944 A1 | 12/2002 | Noble | |
| 2003/0104346 A1 | 6/2003 | Stein | |
| 2003/0107584 A1 | 6/2003 | Clapper | |
| 2003/0133612 A1 | 7/2003 | Fan | |
| 2003/0177681 A1 | 9/2003 | Riley | |
| 2003/0198386 A1 * | 10/2003 | Luo ............................... | 382/199 |

(Continued)

OTHER PUBLICATIONS

Bernard et al., Comparing the effects of text size and format on the readability of computer-displayed Times New Roman and Arial text, International Journal of Human-Computer Studies, 59(6), pp. 823-835, 2003.

(Continued)

*Primary Examiner* — Sheela Chawan
(74) *Attorney, Agent, or Firm* — Andrea Bauer; Hoffman Warnick LLC

(57) ABSTRACT

A method for analyzing a character string, the method including: analyzing a character string to determine one of more characters of the character string; determining from a dictionary source, an alternative character string to the analyzed character string; comparing the analyzed character string with the alternative character string to determine a weighting factor for each of the characters of the analyzed character string relative to the positional arrangement of the characters in the alternative character string; and for each determined weighting factor, generating for each of the characters in the analyzed character string a corresponding character of a particular size as determined by the weighting factor.

17 Claims, 7 Drawing Sheets

(56) References Cited

U.S. PATENT DOCUMENTS

| | | |
|---|---|---|
| 2004/0113927 A1 | 6/2004 | Quinn et al. |
| 2004/0117627 A1 | 6/2004 | Brewington |
| 2004/0125107 A1 | 7/2004 | McCully |
| 2004/0125108 A1 | 7/2004 | McCully |
| 2004/0139400 A1 | 7/2004 | Allam et al. |
| 2004/0183812 A1 | 9/2004 | Raskar et al. |
| 2004/0183925 A1 | 9/2004 | Raskar et al. |
| 2004/0183940 A1 | 9/2004 | Raskar |
| 2004/0184667 A1 | 9/2004 | Raskar et al. |
| 2004/0184677 A1 | 9/2004 | Raskar et al. |
| 2004/0195320 A1 | 10/2004 | Ramsager |
| 2005/0017986 A1 | 1/2005 | Anwar et al. |
| 2005/0028074 A1 | 2/2005 | Harrington et al. |
| 2005/0028075 A1 | 2/2005 | Harrington et al. |
| 2005/0028076 A1 | 2/2005 | Harrington et al. |
| 2005/0028096 A1 | 2/2005 | Harrington et al. |
| 2005/0028097 A1 | 2/2005 | Harrington et al. |
| 2005/0028098 A1 | 2/2005 | Harrington et al. |
| 2005/0028099 A1 | 2/2005 | Harrington et al. |
| 2005/0039138 A1 | 2/2005 | Urbina |
| 2005/0045605 A1 | 3/2005 | Simke |
| 2005/0071743 A1 | 3/2005 | Harrington et al. |
| 2005/0071755 A1 | 3/2005 | Harrington et al. |
| 2005/0116965 A1 | 6/2005 | Grunder |
| 2005/0154980 A1 | 7/2005 | Purvis et al. |
| 2006/0017731 A1 | 1/2006 | Matskewich et al. |
| 2006/0017732 A1 | 1/2006 | Matskewich et al. |
| 2006/0017733 A1 | 1/2006 | Matskewich et al. |
| 2006/0028012 A1 | 2/2006 | Holder |
| 2006/0029258 A1 | 2/2006 | Harrington et al. |
| 2006/0029259 A1 | 2/2006 | Harrington et al. |
| 2006/0029260 A1 | 2/2006 | Harrington et al. |
| 2006/0039585 A1 | 2/2006 | Harrington et al. |
| 2006/0049248 A1 | 3/2006 | Becker et al. |
| 2006/0077544 A1 | 4/2006 | Stark |
| 2006/0116977 A1 | 6/2006 | Burger et al. |
| 2006/0146075 A1 | 7/2006 | Weiss et al. |
| 2006/0153616 A1 | 7/2006 | Hofmann |
| 2006/0155699 A1 | 7/2006 | Purvis et al. |
| 2006/0164682 A1 | 7/2006 | Lev |
| 2006/0181562 A1 | 8/2006 | Hirano et al. |
| 2006/0231629 A1 | 10/2006 | Massieu |
| 2007/0003294 A1 | 1/2007 | Yaguchi et al. |
| 2007/0036390 A1 | 2/2007 | Harrington et al. |
| 2007/0036391 A1 | 2/2007 | Harrington et al. |
| 2007/0036392 A1 | 2/2007 | Harrington et al. |
| 2007/0036393 A1 | 2/2007 | Harrington et al. |
| 2007/0036394 A1 | 2/2007 | Harrington et al. |
| 2007/0041617 A1 | 2/2007 | Harrington et al. |
| 2007/0041618 A1 | 2/2007 | Harrington et al. |
| 2007/0041619 A1 | 2/2007 | Harrington et al. |
| 2007/0061384 A1 | 3/2007 | Harrington et al. |
| 2007/0094591 A1 | 4/2007 | Etgen et al. |
| 2007/0098288 A1 | 5/2007 | Raskar et al. |
| 2007/0133842 A1 | 6/2007 | Harrington |
| 2007/0164112 A1 | 7/2007 | Dant |
| 2007/0176001 A1 | 8/2007 | Cattrone et al. |
| 2008/0023552 A1 | 1/2008 | Gillet et al. |
| 2008/0043996 A1 | 2/2008 | Dolph et al. |
| 2008/0061473 A1 | 3/2008 | Laracey et al. |
| 2008/0151274 A1 | 6/2008 | Arakawa |
| 2008/0194016 A1 | 8/2008 | Kusters |
| 2008/0200255 A1 | 8/2008 | Eisele |
| 2008/0220195 A1 | 9/2008 | Henshaw |
| 2008/0266298 A1 | 10/2008 | Hess et al. |
| 2008/0306684 A1 | 12/2008 | Yamazaki |
| 2009/0005176 A1 | 1/2009 | Morrow et al. |
| 2009/0010442 A1 | 1/2009 | Usher et al. |
| 2009/0035777 A1 | 2/2009 | Kokoris et al. |
| 2009/0097665 A1 | 4/2009 | L'Esperance et al. |
| 2009/0128582 A1 | 5/2009 | Weiss et al. |
| 2010/0290633 A1 | 11/2010 | Chen et al. |

OTHER PUBLICATIONS

Miellet et al., Psychological Science, Research Article, Parafoveal Magnification, Visual Acuity Does Not Modulate the Perceptual Span in Reading, University of Glasgow, vol. 20, No. 6, Copyright 2009 Association for Psychological Science, pp. 721-728.

Nazir et al., Letter legibility and visual word recognition, http://nivea.psycho.univ-paris5.fr/Papillon/Papillon.html, Printed Apr. 27, 2010, 22 pages.

Victor Gaultney, Balancing typeface legibility and economy, Practical techniques for the type designer, Copyright 2001, 14 pages.

Andrew F. Hobson; "Noise Activiated Automatic Volume Control"; Accession Number: AD0721596; Report Date: Dec. 1970; p. 1; Public STINET (Scientific Technical Information Network) at the Defense Technical Information Center (DTIC).

* cited by examiner

FIG. 8 Configuration
FIG. 9 configuration

ANALYSING CHARACTER STRINGS

FIELD OF THE INVENTION

The invention relates to the field of data processing systems. In particular, the invention relates to an improved method and system for analyzing character strings in order to improve the legibility of words.

RELATED ART

Many organizations rely on accurate and reliable information for a variety of different purposes. Organizations also rely on consumers of information to read and interpret the information correctly. For example, in the health care industry one of the main factors that can contribute to the incorrect administration of a medication is the confusion that can arise with 'look-alike' and 'sound-alike' names of medication. Examples are Hydroxyzine and Hydralazine, or Brupropion and Buspirone. This could have disastrous consequences if, for example, a medical professional reads the name of the medication incorrectly or administers an incorrect dosage to a patient.

Many people also suffer from dyslexia. Dyslexia is a condition that impairs a person's ability to read. If not identified early enough in a child's development, dyslexia can inhibit a child's educational progress and destroy their confidence. Rather then relying on traditional teaching methods to help a child it may be more helpful to display text of the written word in a format that would make it much easier for a person to read.

SUMMARY OF THE INVENTION

Therefore, there is a need in the art to find a way in which to represent words in a form which allows words to be read easily, accurately, and quickly and in a form that allows words to be more legible.

Viewed from a first aspect, the present invention provides a method for analyzing a character string, the method comprising: analyzing a character string to determine one of more characters of the character string; determining from a dictionary source, an alternative character string to the analyzed character string; comparing the analyzed character string with the alternative character string to determine a weighting factor for each of the characters of the analyzed character string relative to a positional arrangement of the characters in the alternative character string; and for each determined weighting factor, generating for each character in the analyzed character string a corresponding character of particular size and height as determined by the weighting factor.

The present invention advantageously provides a method in which it is possible to detect characters of a word that have a higher or lower significance when compared to other characters of the word. By determining characters of a word that have a greater or lower significance, each individual character can be displayed in differing font sizes (depending on whether the character is of a greater or lesser significance). Advantageously, by following this method words can be printed or displayed in an optimal manner not just to improve legibility but also to save real estate on a computer display or in a printed form.

The present invention provides a method wherein an additional vowel reduction weighting factor is applied to the analyzed character string in order to generate a corresponding character string of a particular size.

The present invention provides a method wherein the vowel weighting factor decreases or increases the size of the corresponding character string.

The present invention provides a method wherein the weighting factor increases or decreases the size of the corresponding character.

The present invention provides a method further comprising formatting each of the corresponding characters based on their respective assigned weighting factors for collectively displaying each of the corresponding characters as a word having characters of differing sizes.

The present invention provides a method wherein the formatting further comprises formatting each of the corresponding characters along a horizontal alignment whereby a horizontal alignment takes place in an upper quartile of each of the corresponding characters.

Viewed from another aspect, the present invention provides an apparatus for performing a method for analyzing a character string, the method comprising: analyzing a character string to determine one of more characters of the character string; determining from a dictionary source, an alternative character string to the analyzed character string; comparing the analyzed character string with the alternative character string to determine a weighting factor for each of the characters of the analyzed character string relative to a positional arrangement of the characters in the alternative character string; and for each determined weighting factor, generating for each character in the analyzed character string a corresponding character of particular size and height as determined by the weighting factor.

The present invention provides an apparatus wherein an additional vowel reduction weighting factor is applied to the analyzed character string in order to generate a corresponding character string of a particular size.

The present invention provides an apparatus wherein the vowel weighting factor decreases the size of the corresponding character string.

The present invention provides an apparatus wherein the weighting factor increases the size of the corresponding character.

The present invention provides an apparatus wherein each of the corresponding characters are formatted based on their respective assigned weighting factors for collectively displaying each of the corresponding characters as a word having characters of differing sizes.

The present invention provides an apparatus wherein the formatting further comprises formatting each of the corresponding characters along a horizontal alignment whereby a horizontal alignment takes place in the upper quartile of each of the corresponding characters.

Viewed from another aspect, the present invention provides computer program code stored on a computer readable medium for performing a method for analyzing a character string, when loaded into a computer system and executed, the method comprising: analyzing a character string to determine one of more characters of the character string; determining from a dictionary source, an alternative character string to the analyzed character string; comparing the analyzed character string with the alternative character string to determine a weighting factor for each of the characters of the analyzed character string relative to a positional arrangement of the characters in the alternative character string; and for each determined weighting factor, generating for each character in the analyzed character string a corresponding character of particular size and height as determined by the weighting factor.

BRIEF DESCRIPTION OF THE DRAWINGS

Embodiments of the invention will now be described, by way of example only, with reference to the accompanying drawings.

FIGS. 8 and 9 depict illustrative output generated by the output engine in accordance with embodiments of the present invention.

DETAILED DESCRIPTION OF THE INVENTION

Figure 1:
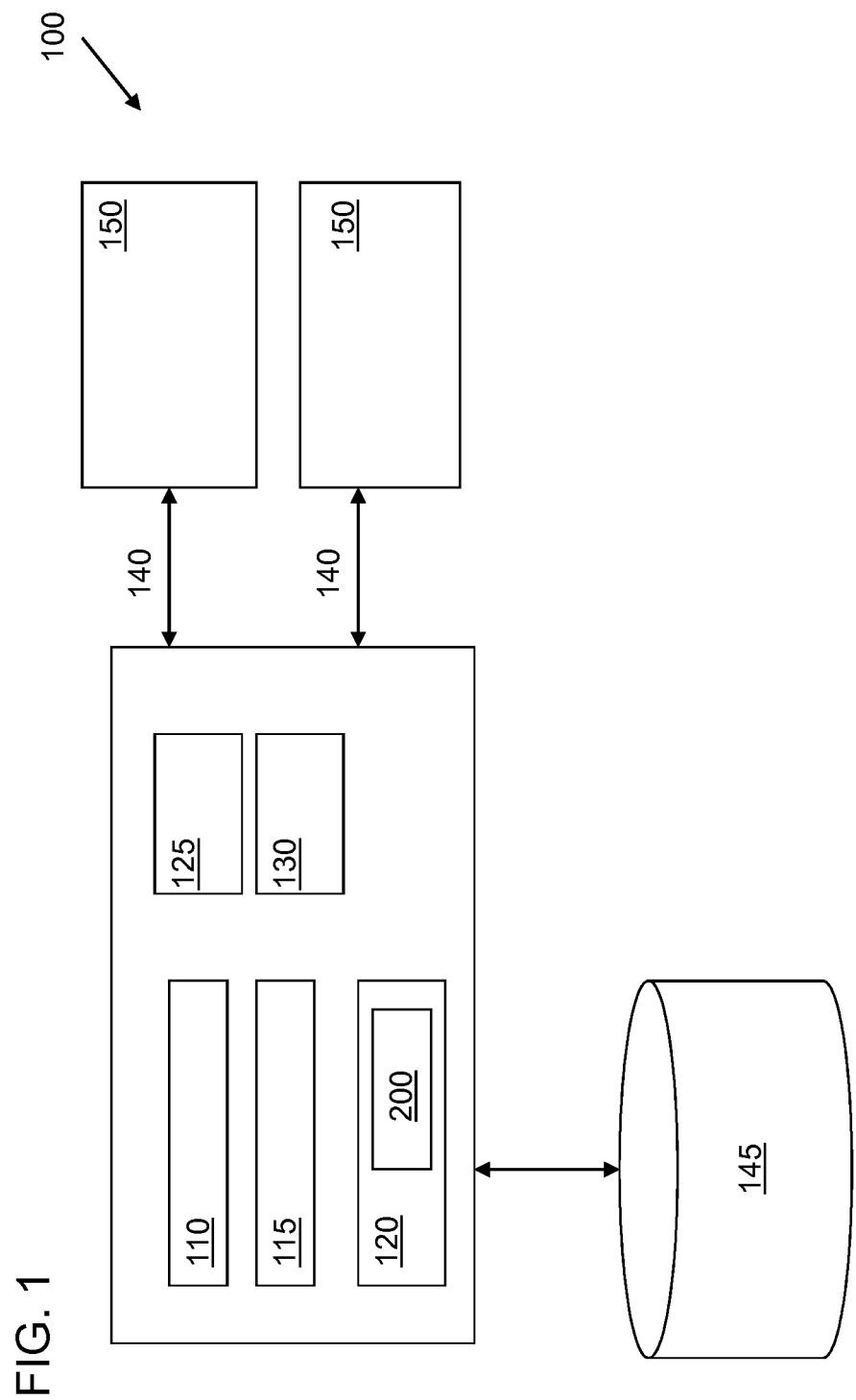
FIG. 1 is a data processing system in which an embodiment of the present invention may be embodied.

FIG. 1 details a data processing system 100 for use with an embodiment of the present invention. The data processing system 100 comprises hardware 115 and software for co-operating with each other in order to provide embodiments of the invention.

Typically, the data processing system 100 comprises some form of storage 120 in which to either store data locally on the data processing system 100 or via external storage 145, main memory for loading and running a natural language analyzing application 200, input system 125 for receiving data for analysis by the natural language analyzing application 200 and a display 130 for viewing an output of the natural language analyzing application 200. The input system 125 can take the form of a keyboard, mouse, scanner, optical character recognition system, etc.

The data processing system 100 may either be operable as a server or a client device 150. When operating as a server, client devices 150 are able to communicate with the server over a network 140. Client devices 150 can send requests to the natural language analyzing application 200 located on the server and subsequently receive responses from the natural language analyzing application 200.

When the natural language analyzing application 200 is operable on a client device 150, the client device 150 is operating in a standalone mode.

Figure 2:
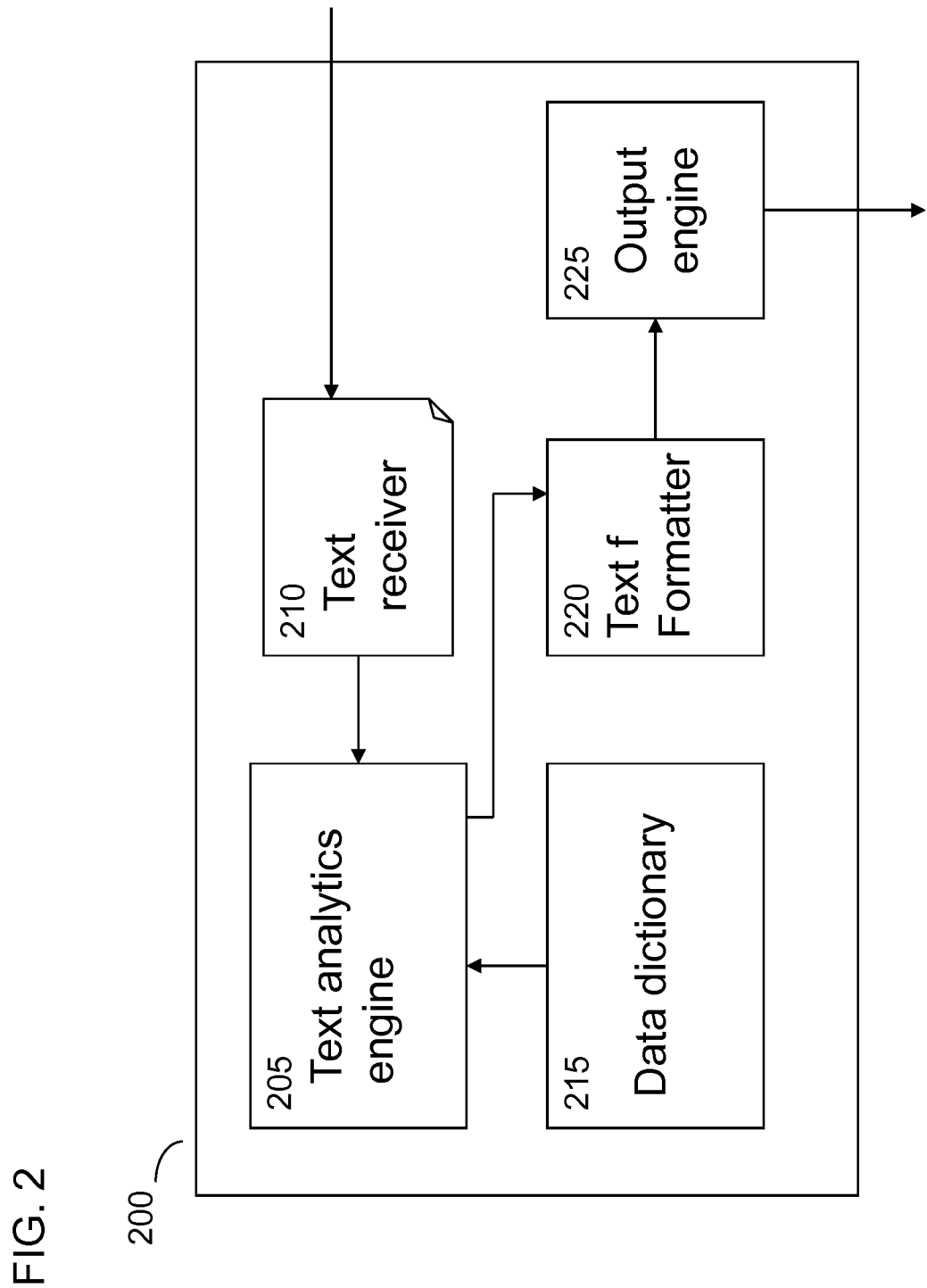
FIG. 2 is a block diagram illustrating the natural language analysis application of an embodiment of the present invention.
Figure 3:
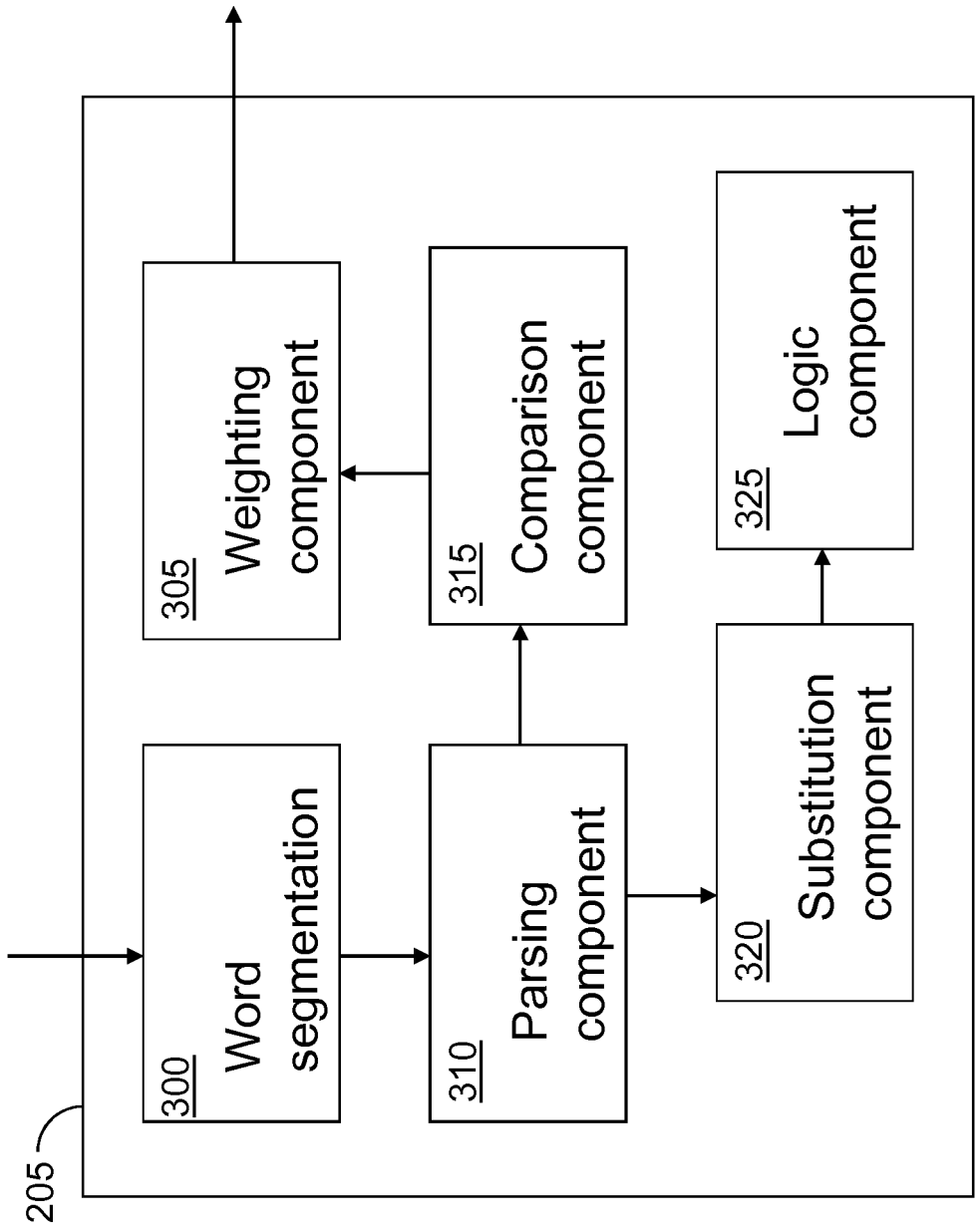
FIG. 3 is a block diagram detailing sub-components of the natural language analysis component of FIG. 2 in accordance with an embodiment of the present invention.
Figure 4:
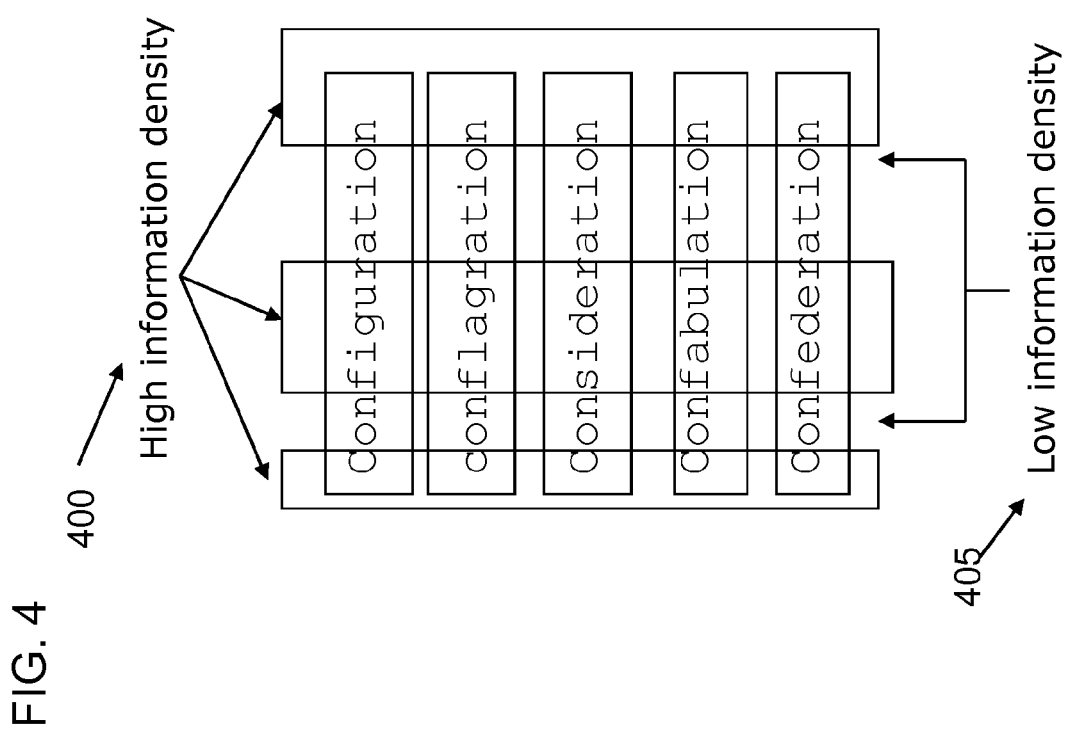
FIG. 4 is an illustration detailing areas of a word that contribute to recognizing a word effectively.
Figure 5:
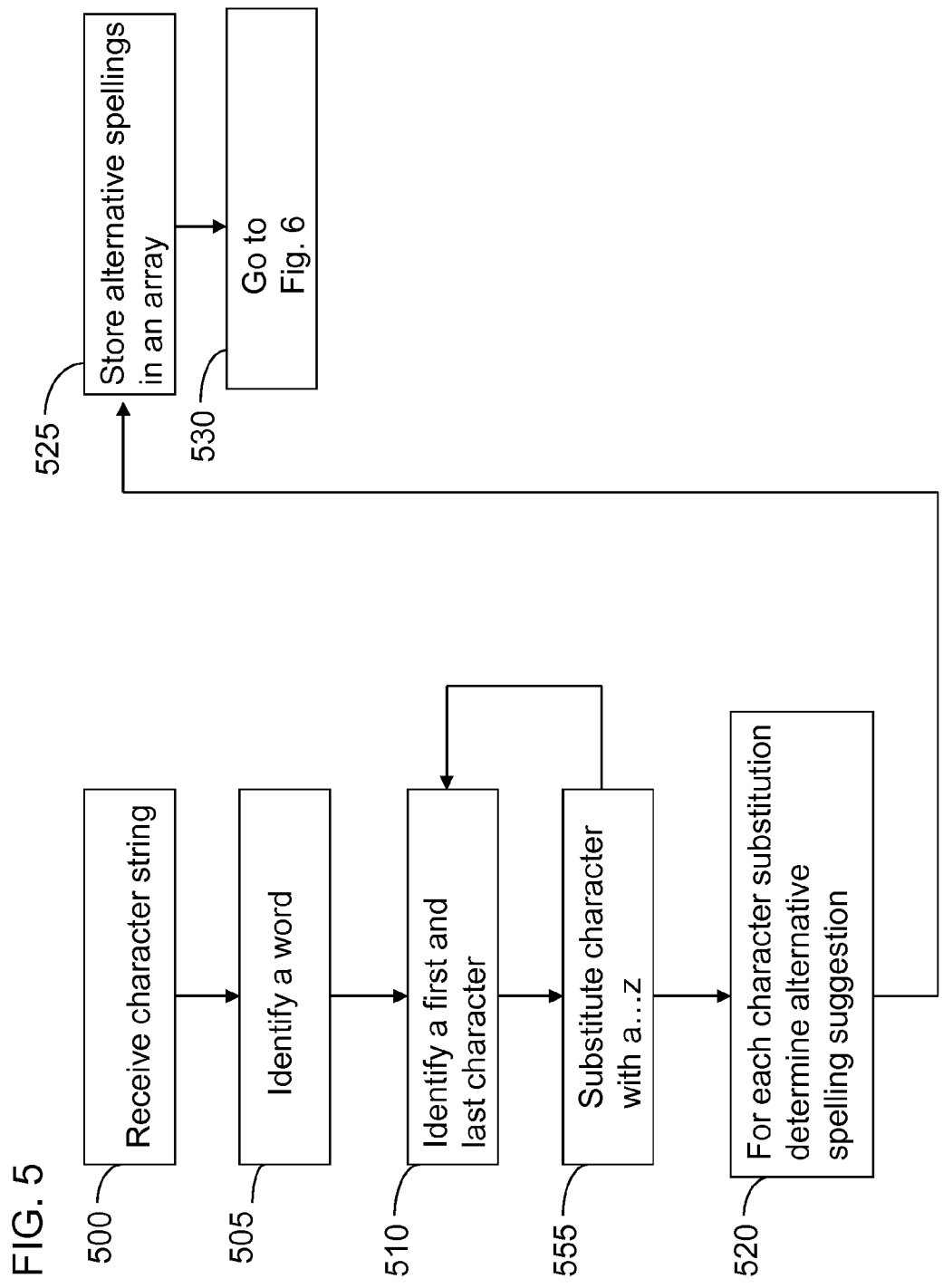
FIG. 5 is a flow chart detailing the process performed by the text analytic engine in accordance with an embodiment of the present invention.
Figure 6:
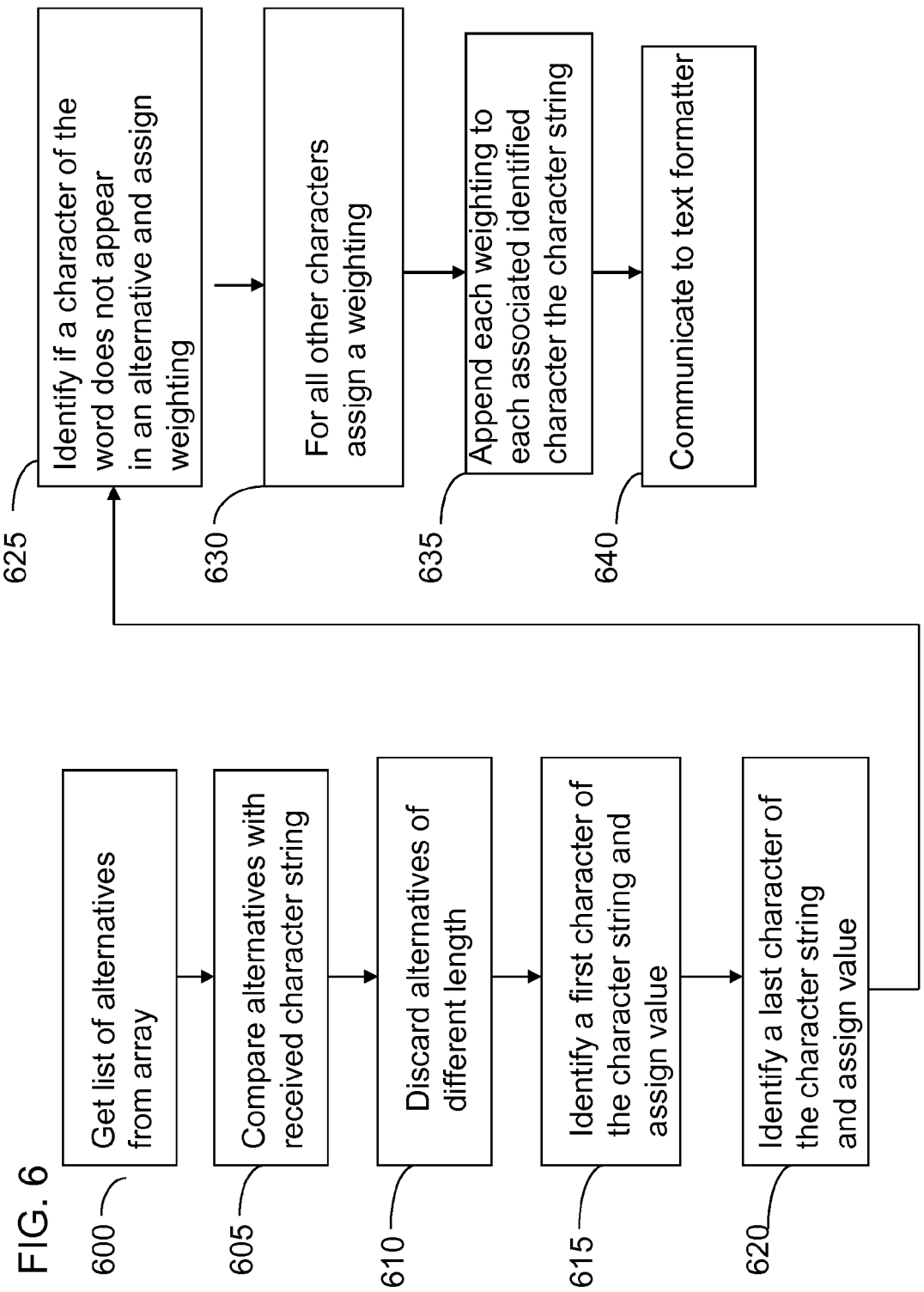
FIG. 6 is a flow chart detailing the follow on process as depicted in the flow chart of FIG. 5 in accordance with an embodiment of the present invention.

FIGS. 2 and 3 detail a number of components of the natural language analysis application 200. The components comprise a data dictionary 215, a text receiver application 210, a text formatter engine 220, an output engine 225, and a text analytics engine 205 comprising a word segmentation component 300, a parsing component 310, a comparison component 315, a weighting component 305, a substitution component 320, and a logic component 325. Each of these components will be explained in turn with reference to FIGS. 2, 3 and 4 and in parallel with the flow charts of FIGS. 5 and 6.

The text receiver component 210 receives data for analyzing from various forms of data sources (step 500). A data source may comprise data from a word processor document, an email, or any other form of structured or non structured data. The text receiver component 210 communicates the data to a text analytics engine 205 for processing.

A word segmentation component 300 receives the data from the text receiver component 210 and begins by determining the language of the data of the document. The word segmentation component 300, then proceeds to identify words by interfacing with a language specific instruction set that determines how to identify words from a continuous stream of data (step 505). The language specific instruction set also comprises rules that determine word boundaries, for example, words from languages which are not typically represented by spaces between different words, etc. Thus, the language specific instruction set can deal with a number of different type of languages.

Each of the identified words is added to a queue for further processing. For each identified word in the queue, the parsing component 310 identifies the number of characters of the word and stores this information in memory.

The parsing component 310 also identifies the first character and the last character of the word and stores this information in memory (step 510). The first and the last characters of a word are important because, with reference to FIG. 4, it is these first and last letters that are considered to be of 'high information density' 400, i.e., it is these characters that a person initially recognizes and places the most importance on in terms of meaning and understanding. Therefore, in communication with the data dictionary 215, only alternative spelling suggestions having the same first and last characters as the analyzed word will be retrieved from the data dictionary 215.

However, in order to obtain a number of alternative spelling suggestions from the data dictionary 215, a substitution component 320 parses the word stored in the queue and substitutes each identified character, after the first character and up to the last character of the word, with another character of an alphabet (step 515). For example, taking the word configuration, the substitution component 320 begins at the letter 'o' and substitutes the letter 'o' with another letter of the alphabet (e.g., 'a') and then communicates with the data dictionary 215 to determine if there is a word such as 'canfiguration'. If no such word exists, the substitution component 320 substitutes the character 'o' for another letter in the alphabet to find one or more alternative spelling suggestions.

Then, the substitution component 320 proceeds to the next character in the word and substitutes the letter 'n' with another character of the alphabet and so on to derive a number of alternative spelling suggestions. This process is continued until a number of alternative spelling suggestions are obtained.

A person skilled in the art will realize that any form of substitution algorithm can be used in order to identify a number of alternative spelling suggestions. A substitution algorithm may also 'learn' that particular words always have a number of alternative spelling suggestions, look-alikes' or similar words and these words can be stored in an alternative dictionary source for retrieval when the particular word is subsequently analyzed. Thus, having the advantage of faster access and retrieval times.

As an example, the alternative spelling suggestions for the word 'configuration' may be as follows:

Example 1 conflagration
consideration confabulation
confederation
communication
communization The alternative spelling suggestions are stored in an array (step 525, step 530) and are communicated to a comparison component 315 for processing.

The comparison component 315 retrieves the alternative spelling suggestions (example 1) from the array (step 600) and compares the alternative spelling suggestions with the original word (step 605). For example, comparing the word 'configuration' with the words 'conflagration'.

If any alternative spelling suggestions comprise a greater or smaller number of characters than the original word, these alternative spelling suggestions are disregarded (step 610). For example, the word 'configuration' comprises thirteen characters, but if an alternative spelling suggestion comprised less than or more than thirteen characters, this alternative spelling suggestion would be disregarded.

Next, the comparison component 315 identifies the first character of the original word (configuration) and communicates with a weighting component 305 in order to assign a calculation/weighting factor (step 615). The comparison component 315 also identifies the last character of the word and the weighting component 305 assigns a weighting factor to this character (step 620).

In an embodiment, the weighting factor assigned to the first and the last characters of the word is a weighting factor that represents the importance or significance of the first and the last characters of the word. As has already been shown with reference to FIG. 4, the first and last characters of the word have the most significance because of their 'high information density' 400.

The comparison component 315 compares each of the characters (after the first character and up to the last character identified in the word) with each of the characters of each of the alternative spelling suggestions in order to determine whether this character appears in any of the alternative spelling suggestions comparative to their positional arrangement (i.e., 'high information density area' or 'low information density area') in the alternative spelling suggestions.

If a determination is made that a character does not appear in any of the alternative spelling suggestions the comparison component 315 assigns a weighting factor which is indicative of the character's higher importance or significance when compared to the alternative spellings (step 625). Thus characters having a higher significance may be formatted in a larger font size compared to other characters of the words having a detected lower importance.

If a determination is made that a character of a word does appear in one or more alternative spelling suggestions, the analysis component 205 assigns a weighting factor which is indicative of the relative importance (greater or lower) of the character when compared to the one or more alternative spelling suggestions (step 630). Each assigned value is written to a record (step 635) associated with the analyzed word and stored in a database and communicated to the text formatter component 220 (step 640).

The above algorithm can be understood as follows:
Disregard alternative spelling suggestions having a greater or lesser number of characters when compared to the word being analyzed.
For digits (integer values) 0 to 9 assign a weighting of 1
For the first and last characters in the word assign a weighting value of 1
For all other characters between the first and the last characters assign a value which reflects the relative importance or significance of the character when compared to the corresponding characters in the alternative spelling suggestions, wherein significance=1−(cnt/(cnt+cnttot))*0.8, wherein 'cnt' is the number of occurrences of the character across alternative spelling suggestions and 'cnttot' is the total number of alternative spelling suggestions.

A person skilled in the art will realize that the weighting factor of '0.8' is an example weighting factor and that other values may be used without departing from the scope of the invention. The weighting factor can be modified to give different results in the resulting output string depending on the environment in which the invention is utilized.

Further, for an original word comprising only one character in common with an alternative spelling suggestion, this character is assigned a weighting factor of 0.85. Further for any analyzed words comprising only two characters in common with the original word, these characters are assigned a weighting factor of 0.85.

In another embodiment, after the weighting factor has been applied, a vowel reduction factor may be applied in order to decrease the size of vowels, thus reducing the size of the vowels further.

A person skilled in the art will realize that other variations of common characters and weighting factors can be used without departing from the scope of the invention.

For example, using the word 'configuration' the resulting weight factors assigned after comparison with the each of the alternative spelling suggestions (conflagration, consideration, confabulation, confederation, communication and communization) is as illustrated in Example 2:

Example 2

(c) 1.00
(o) 0.72
(n) 0.88
(f) 0.88
(i) 0.81
(g) 0.96
(u) 0.79
(r) 0.90
(a) 0.72
(t) 0.85
(i) 0.72
(o) 0.72
(n) 1.00

In an embodiment the vowel reduction factor may be a value of 0.85. However a person skilled in the art will realize that the weighting factor of '0.85' is an example vowel reduction weighting factor and that other values may be used without departing from the scope of the invention.

Once each character of the word has been analyzed, a weighting factor record is generated and associated with the word.

The associated record can be stored in a database for further reference. Example 3, below, is an example of an associated record which is stored for later use.

Example 3 cn13 conflagration
cn13 consideration
cn13 confabulation
cn13 confederation
cn13 communication
cn13 communization The key 'cn13' infers that the words start with 'c', ends with 'n' and has 13 characters. Then when any subsequent words are detected that begin with the character 'c' and end with the character 'n', a lookup is performed in the records database to locate the record associated with the analyzed word.

The analyzed word and the generated record are transmitted to the text formatter 220 for further processing.

Figure 7:
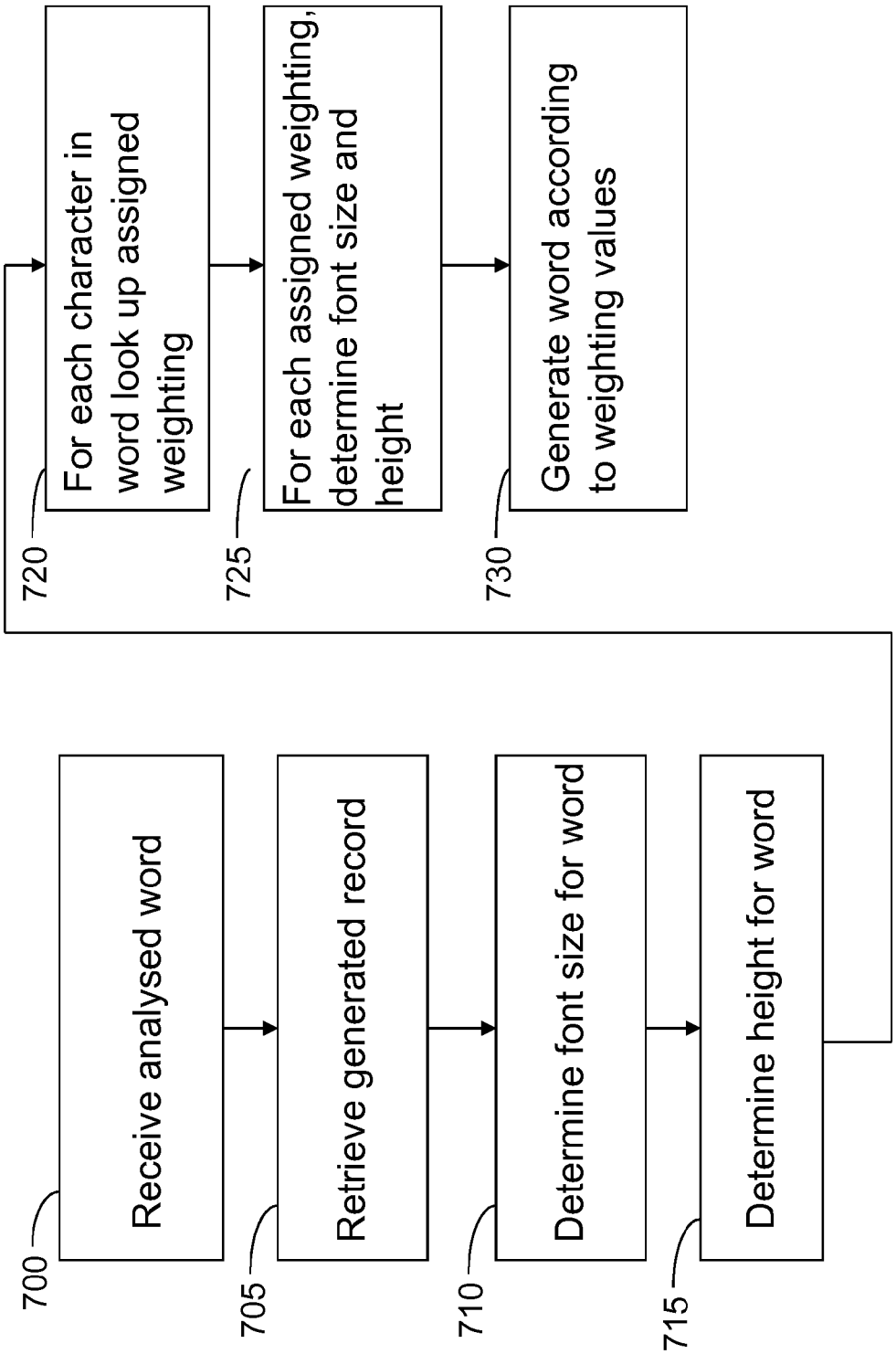
FIG. 7 is a flow chart detailing the process performed by the text formatter component in accordance with an embodiment of the present invention.

With reference to FIG. 7, the text formatter 220 interprets the generated record and individually formats each of the characters in the word in accordance with the weightings assigned to each character.

The text formatter 220 receives the analyzed word from the comparison component 315 and analyses the generated record (steps 640, 700). The text formatter 220 communicates with a logic component 325 and the logic component 325 reads each weighting assigned to each character of the word and using rules determines the height, size and shape of each of the characters (step 715).

For example, the generated record for the word 'configuration' may be as follows:

Example 4

(c) 1.00
(o) 0.72
(n) 0.88
(f) 0.88
(i) 0.81
(g) 0.96
(u) 0.79
(r) 0.90
(a) 0.72
(t) 0.85
(i) 0.72
(o) 0.72
(n) 1.00

The logic component 325 comprises rules which dictate how a character should be formatted and displayed in relation to its assigned weighting factor. In the example above, the characters 'c' and 'n' are displayed at full size, for example, font size 10. However, the characters 'o', 'a' and 'i' will be displayed at the smallest size relative to the other characters (step 725).

Thus the logic component 325 derives formats the word 'configuration' and the output engine 225 generates the output (step 730) shown in FIG. 8.

In another embodiment the text formatter 220 formats the output text such that the characters are displayed along a horizontal alignment whereby a horizontal alignment takes place in the upper quartile of each character. An example is shown in FIG. 9.

The above process is completed for each word stored in the queue, until the entire text of the document has been formatted.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

The invention can take the form of a computer program product accessible from a computer-usable or computer-readable medium providing program code for use by or in connection with a computer device or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A computer-implemented method for analyzing a character string, the method comprising:
   analyzing a character string to determine one of more characters of the character string;
   determining from a dictionary source, an alternative character string to the analyzed character string;
   comparing the analyzed character string with the alternative character string to determine a weighting factor for each of the characters of the analyzed character string relative to a positional arrangement of the characters in the alternative character string; and
   for each determined weighting factor, generating for each character in the analyzed character string a corresponding character of a particular font size as determined by the weighting factor, the generating including modifying the font size of the corresponding character based on the weighting factor.

2. The method as claimed in claim 1, further comprising:
   applying a vowel reduction weighting factor to the analyzed character string in order to decreases a font size of vowels detected in the corresponding character string.

3. The method as claimed in claim 1, wherein the weighting factor increases the font size of the corresponding character.

4. The method as claimed in claim 1, further comprising:
   formatting each corresponding character based on their respective assigned weighting factors for collectively displaying each of the corresponding characters as a word having characters of differing font sizes.

5. The method as claimed in claim 4, wherein the formatting further comprises:
   formatting each corresponding character along a horizontal alignment wherein a horizontal alignment takes place in an upper quartile of each of the corresponding characters.

6. An apparatus for analyzing a character string, comprising:
   a computer device configured for:
   analyzing a character string to determine one of more characters of the character string;
   determining from a dictionary source, an alternative character string to the analyzed character string;
   comparing the analyzed character string with the alternative character string to determine a weighting factor for each of the characters of the analyzed character string relative to a positional arrangement of the characters in the alternative character string; and
   for each determined weighting factor, generating for each character in the analyzed character string a corresponding character of particular font size and height as determined by the weighting factor, the generating including modifying the font size of the corresponding character based on the weighting factor.

7. The apparatus as claimed in claim 6, wherein an additional vowel reduction weighting factor is applied to the analyzed character string in order to generate a corresponding character string of a particular font size.

8. The apparatus as claimed in claim 6, wherein the vowel weighting factor decreases the font size of the corresponding character string.

9. The apparatus as claimed in claim 6, wherein the weighting factor increases the font size of the corresponding character.

10. The apparatus as claimed in claim 6, wherein the computer device is further configured for:
- formatting each corresponding character based on their respective assigned weighting factors for collectively displaying each of the corresponding characters as a word having characters of differing font sizes.

11. The apparatus as claimed in claim 10, wherein the formatting further comprises:
- formatting each corresponding character along a horizontal alignment whereby a horizontal alignment takes place in an upper quartile of each of the corresponding characters.

12. Computer program code stored on a computer readable hardware storage device for performing a method for analyzing a character string, when loaded into a computer system and executed, the method comprising:
- analyzing a character string to determine one of more characters of the character string;
- determining from a dictionary source, an alternative character string to the analyzed character string;
- comparing the analyzed character string with the alternative character string to determine a weighting factor for each of the characters of the analyzed character string relative to a positional arrangement of the characters in the alternative character string; and
- for each determined weighting factor, generating for each character in the analyzed character string a corresponding character of particular font size and height as determined by the weighting factor, the generating including modifying the font size of the corresponding character based on the weighting factor.

13. The computer program code as claimed in claim 12, wherein an additional vowel reduction weighting factor is applied to the analyzed character string in order to generate a corresponding character string of a particular font size.

14. The computer program code as claimed in claim 12, wherein the vowel weighting factor decreases the font size of the corresponding character string.

15. The computer program code as claimed in claim 12, wherein the weighting factor increases the font size of the corresponding character.

16. The computer program code as claimed in claim 12, wherein the method further comprises:
- formatting each corresponding character based on their respective assigned weighting factors for collectively displaying each of the corresponding characters as a word having characters of differing font sizes.

17. The computer program code as claimed in claim 16, wherein the formatting further comprises:
- formatting each corresponding character along a horizontal alignment whereby a horizontal alignment takes place in an upper quartile of each of the corresponding characters.

* * * * *